UNITED STATES PATENT OFFICE.

CHARLES MOREY, OF PARIS, FRANCE.

IMPROVEMENT IN REWORKING HARD-RUBBER COMPOUNDS.

Specification forming part of Letters Patent No. 12,212, dated January 9, 1855.

*To all whom it may concern:*

Be it known that I, CHARLES MOREY, a citizen of the United States, now residing in the city of Paris, Empire of France, have invented a new and useful Improvement in Making Various Shaped Articles of Hard Vulcanized India-Rubber; and I do hereby declare that the following is a full and exact description of the same.

The nature of my invention consists in forming of hard vulcanized india-rubber shavings, scraps, filings, dust, powder, or sheets of such hard vulcanized india-rubber, by means of a high degree of heat and pressure, various articles of an even and embossed surface of great compactness and hardness, admitting a high polish.

Hitherto the hard vulcanized india-rubber shavings, scraps, filings, powder, and all kinds of offal of that material have been considered utterly useless. To save this large quantity of hard vulcanized india-rubber shavings, scraps, filings, dust, and powder which was wasted in the manufacture of that article, I have invented a new method, of which the following is an exact description.

When I make snuff-boxes, knife-handles, combs, or like articles for which the hard rubber may be substituted, I take a metal mold, and, in order to prevent the adhesion of the material, I rub it slightly over with tallow or any other similar substances. When the mold is properly adjusted I throw scraps or filings of hard vulcanized india-rubber into it until I obtain the required thickness of the article. When I use sheets of hard vulcanized india-rubber I place pieces of sheet of the size of the article to be made into the mold. When the mold is thus filled I close it and bring it under a powerful press. When it is sufficiently compressed I then take the mold from the press and place it upon thick plates of iron made red hot. A similar heated plate I place upon the top of the mold, and introduce it thus again into the press. In proportion as the mold gets hot I increase the pressure, and when the iron plates have imparted to the mold sufficient heat I withdraw it from the press and put it into cold water, where it remains until cool. The article is then taken from the mold, having obtained all the forms of the mold, besides a high degree of compactness, solidity, and polish, equal to india-rubber which has been submitted to the process of vulcanization.

To make the articles of a variegated color, veined, striped like marble, I introduce into the metal mold with the dust or powder scraps or figures cut out of colored india-rubber, mineral color or other substances. Upon that I place the scraps or filings of hard vulcanized india-rubber. I introduce again scraps of colored minerals or other substances, and proceed in completing the operation as above described.

The articles may be variegated with one or several colors, and when polished look like a mineral substance full of incrustated crystalline particles.

The dust or powder of hard vulcanized india-rubber can be also used for soldering hard vulcanized india-rubber. The soldering is performed in the following manner: The broken parts are first scraped off. Dust or powder of hard vulcanized india-rubber is introduced between the scraped parts, the whole is submitted to a high degree of heat and pressure, whereby the broken parts are so beautifully and well united that it is impossible to say where the article had been broken.

What I claim as my invention, and desire to secure by Letters Patent, is—

1. Forming or molding scrapings, filings, dust, powder, or sheets of hard vulcanized india-rubber into a compact solid mass by means of a high degree of heat and pressure, as above described.

2. The application of dust, powder, filings of hard vulcanized india-rubber, for the soldering or uniting hard vulcanized india-rubber.

CHARLES MOREY.

Witnesses:
 H. MEZIG,
 C. MACRAE.